United States Patent
Nogami

(10) Patent No.: US 9,041,514 B2
(45) Date of Patent: May 26, 2015

(54) RFID TAG AND RFID TAG SYSTEM

(71) Applicant: OMRON CORPORATION, Kyoto (JP)

(72) Inventor: Hidekatsu Nogami, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 36 days.

(21) Appl. No.: 13/826,387

(22) Filed: Mar. 14, 2013

(65) Prior Publication Data

US 2013/0241704 A1 Sep. 19, 2013

(30) Foreign Application Priority Data

Mar. 15, 2012 (JP) ................. 2012-058699

(51) Int. Cl.
*G06K 7/10* (2006.01)
*G06K 7/00* (2006.01)
*G06K 19/077* (2006.01)

(52) U.S. Cl.
CPC .......... *G06K 7/10316* (2013.01); *G06K 7/0008* (2013.01); *G06K 7/10346* (2013.01); *G06K 19/07786* (2013.01)

(58) Field of Classification Search
CPC ............ G06K 7/0008; G06K 7/10316; G06K 7/10346; G06K 19/07786; G06K 19/0723; G06K 7/0006; H04B 7/10; H04B 5/02; H04B 7/0602

USPC ................ 340/10.1, 10.3, 10.31, 10.32, 10.4, 340/10.41, 10.5, 10.51, 572.1, 572.7
See application file for complete search history.

(56) References Cited

U.S. PATENT DOCUMENTS

| | | | |
|---|---|---|---|
| 2005/0156806 A1* | 7/2005 | Ohta et al. ................. | 343/834 |
| 2006/0261938 A1* | 11/2006 | Lai et al. .................... | 340/505 |
| 2007/0090925 A1* | 4/2007 | Tanaka et al. ............. | 340/10.1 |
| 2010/0176928 A1* | 7/2010 | Isomura ..................... | 340/10.3 |

FOREIGN PATENT DOCUMENTS

JP 4581534 9/2010

OTHER PUBLICATIONS

U.S. Appl. No. 13/826,200 to Hidekatsu Nogami, which was filed Mar. 14, 2013.
U.S. Appl. No. 13/826,287 to Hidekatsu Nogami, which was filed Mar. 14, 2013.

* cited by examiner

*Primary Examiner* — Nabil Syed
(74) *Attorney, Agent, or Firm* — Greenblum & Bernstein, P.L.C.

(57) ABSTRACT

An aspect of the present invention provides an RFID tag, in which a null point is hardly generated. The RFID tag includes a long antenna provided in a rectangular surface. The antenna is accommodated in a tag case of the RFID tag, and the antenna extends in a direction oblique to sides constituting the rectangular surface of the tag case.

9 Claims, 6 Drawing Sheets

RFID TAG AND RFID TAG SYSTEM

CROSS-REFERENCE TO RELATED APPLICATION

This application claims benefit of priority under 35 U.S.C. § 119 to Japanese Application No. P2012-058699 filed on Mar. 15, 2012, which is expressly incorporated herein by reference in its entirety.

TECHNICAL FIELD

The present invention relates to an RFID tag and an RFID tag system, particularly to an RFID tag and an RFID tag system, which can prevent generation of a null point.

RELATED ART

Conventionally, an RFID tag system including an RFID tag and an RFID reader/writer is provided. In such a RFID tag system, the RFID tag conducts communication with the RFID reader/writer while being usually accommodated in a rectangular tag case.

In the RFID tag, a radio wave transmitted from the RFID reader/writer is reflected by a floor or a wall, and the reflected radio wave (a reflected wave) and a direct wave are combined to generate a point (the null point) where a reading error is generated. Although an UHF-band RFID can conduct long-range communication (about 5 m), the null point is generated by a combination of the reflected wave from a surrounding object and the direct wave, and such an unstable area as falling out of reading is generated in a communication area.

There have been various methods for avoiding an influence of the reflected wave in order to prevent the generation of the null point. However, the methods for easily preventing the generation of the null point is not actually implemented.

SUMMARY

The present invention has been devised to solve the problems described above, and an object thereof is to provide an RFID tag and an RFID tag system, in which the null point is hardly generated.

In accordance with one aspect of the present invention, in an RFID tag system an RFID tag and an RFID reader/writer conduct communication with each other, wherein the RFID reader/writer includes an antenna that transmits and receives a linearly-polarized radio wave having a polarization plane leaned (e.g., slanted) at a predetermined angle with respect to a reflecting surface, an antenna of the RFID tag is disposed so as to have the polarization plane identical to the polarization plane of the radio wave, and the antenna of the RFID tag receives and responds to the radio wave emitted from the antenna of the RFID reader/writer.

In accordance with another aspect of the present invention, an RFID tag that conducts communication with an RFID reader/writer, includes a case or a molding body, in which at least an IC (i.e., an integrated circuit) and an antenna are accommodated, wherein the case or the molding body is formed into a plate shape having a predetermined side, and the antenna of the RFID tag is disposed at a predetermined angle with respect to the predetermined side.

Preferably the predetermined angle of the antenna of the RFID tag is matched with an angle of a polarization plane of a radio wave transmitted by the RFID reader/writer, when the RFID tag is disposed while the predetermined side is used as a base.

Preferably the case or the molding body has a polygonal shape including a rectangle.

Preferably the antenna of the RFID tag is one of a patch antenna and a dipole antenna.

In the present invention, the RFID reader/writer and the RFID tag conduct communication with each other using the antenna that transmits and receives the linearly-polarized radio wave having the polarization plane leaned at the predetermined angle with respect to the reflecting surface. The RFID reader/writer and the RFID tag conduct communication with each other using the linearly-polarized radio wave having the polarization plane leaned at the predetermined angle with respect to the reflecting surface. Therefore, the RFID tag is hardly influenced by a vertical wall surface or a horizontal floor surface, which are frequently provided in an environment where the RFID tag is generally installed.

As a result, the null point can be reduced to establish the stable communication. An additional component is unnecessary for the RFID tag, and a stable communication can easily be realized.

DETAILED DESCRIPTION (1) First Embodiment

Figure 1:
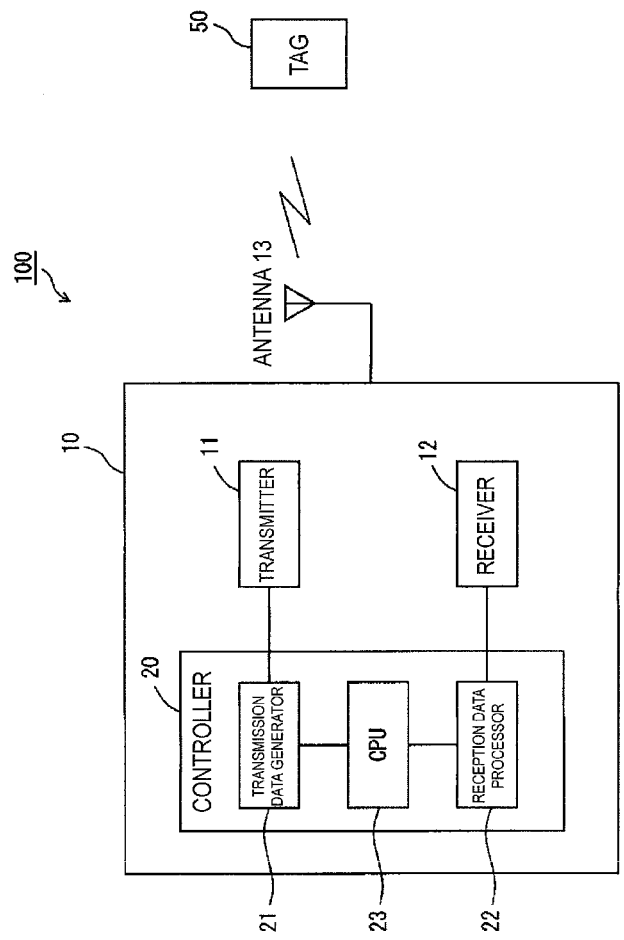
FIG. 1 is a schematic block diagram illustrating an entire configuration of an RFID tag system.

Hereinafter, an embodiment of the present invention will be described with reference to the drawings. FIG. 1 is a schematic block diagram illustrating an entire configuration of an RFID tag system 100 according to an embodiment of the present invention. The RFID tag system 100 includes an RFID reader/writer 10 and an RFID tag 50. The RFID reader/writer 10 includes a controller 20 that controls the whole of the RFID reader/writer 10, a transmitter 11 and a receiver 12, which are connected to the controller 20, and an antenna 13 that is connected to the transmitter 11 and the receiver 12.

The controller 20 includes a CPU 23 that controls the controller 20, a transmission data generator 21 that is controlled by the CPU 23 to generate such predetermined transmission data as a command, and a reception data processor 22 that processes received data received from the RFID tag 50. The data generated by the transmission data generator 21 is transmitted to the RFID tag 50 through the transmitter 11 and the antenna 13. A signal from the RFID tag 50 is processed by the reception data processor 22 through the antenna 13 and the receiver 12.

A first embodiment of the present invention will be described below. In the first embodiment, the RFID reader/writer 10 and the RFID tag 50 communicate with each other using slant polarization. As used herein, the slant polarization means that an orientation of a composite wave of a horizontal electric field and a vertical electric field intersects a ground surface or a wall. For example, when being reflected by a floor or the wall, the slant polarization of obliquely right 45 degrees changes to the slant polarization of obliquely left 45 degrees.

At this point, horizontal polarization differs from vertical polarization in a phase when being reflected by the floor. In a metallic surface, because a phase difference between the horizontal polarization and the vertical polarization is about 180° at a reflection point, a reflected wave of the polarization of obliquely right 45 degrees becomes obliquely left 45 degrees.

In a radio wave, which is output from the RFID reader/writer 10 and incident to the floor or the wall in the slant polarization, a polarization direction changes by 90 degrees. Therefore, a direct wave and the reflected wave exist as a cross polarization component at a position of the RFID tag 50. When the cross polarization component exists while the RFID tag is linear polarization, an influence of the reflected wave can be reduced by combining a polarization plane of the RFID tag and a polarization plane of the direct wave.

When both the antennas of the RFID reader/writer and RFID tag are slanted, the reflected wave is not matched with a polarization direction of the antenna of the RFID tag while the direct wave is matched with the polarization direction of the RFID tag, so that the influence of the reflected wave can be largely reduced.

As described in the related art, the generation of the null point can be prevented when the influence of the reflected wave is reduced.

Figure 2:
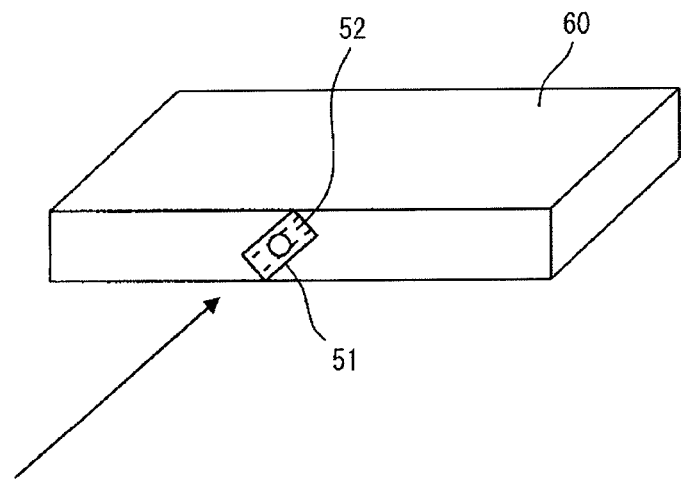
FIG. 2 is a perspective view illustrating a state in which an RFID tag according to a first embodiment is attached to an article.

A specific example in which the RFID tag 50 is obliquely placed on an article will be described below. FIG. 2 is a view illustrating the case that an RFID tag 51 is provided on one end surface of such a rectangular-solid conveyance article (a conveyance medium) 60 as a pallet. The RFID tag 51 is provided on one end surface of the conveyance article 60, and an antenna 52 (indicated by a dotted line in FIG. 2) of the RFID tag 51 is obliquely placed with respect to a rectangular side constituting the end surface of the conveyance article 60. When the RFID tag 51 is attached while slanted with respect to the rectangular side constituting the end surface of the conveyance article 60, inevitably the antenna 52 of the RFID tag 51 is obliquely disposed with respect to a floor surface or a wall surface.

The antenna 52 of the RFID tag 51 is obliquely placed with respect to the floor surface or the wall surface by way of example. At this point, preferably an antenna of the RFID reader/writer is formed into a rod shape and the rod-shaped antenna is obliquely placed with respect to a horizontal surface and a vertical surface. The largest effect is obtained, when the slants of both the antenna 52 of the RFID tag 51 and the antenna of the RFID reader/writer are combined to obliquely place the antenna 52 of the RFID tag 51 and the antenna of the RFID reader/writer with respect to the floor surface or the wall surface.

The antenna of the RFID reader/writer may be a patch antenna or a slot antenna. For the patch antenna, a feeding point may be disposed such that the slant polarization is generated with respect to the floor surface or the wall surface.

Figure 3A:
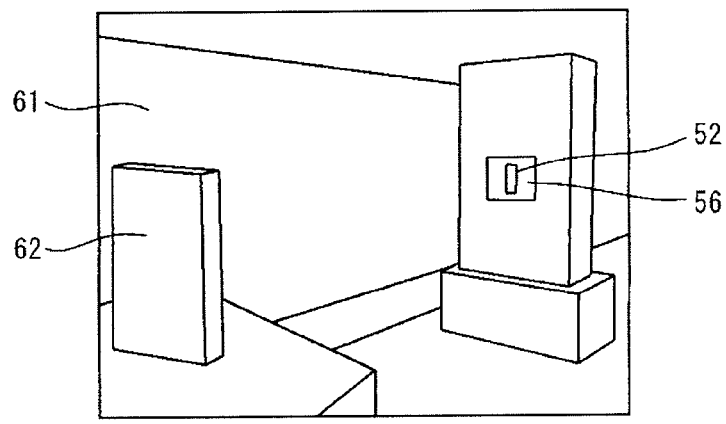
FIGS. 3A and 3B are perspective views illustrating the conventional case and the case that the RFID tag of the first embodiment is attached to the article.
Figure 3B:
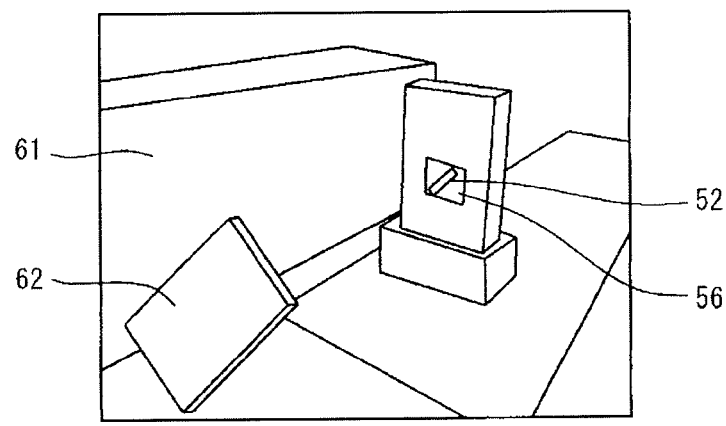
Figure 4:
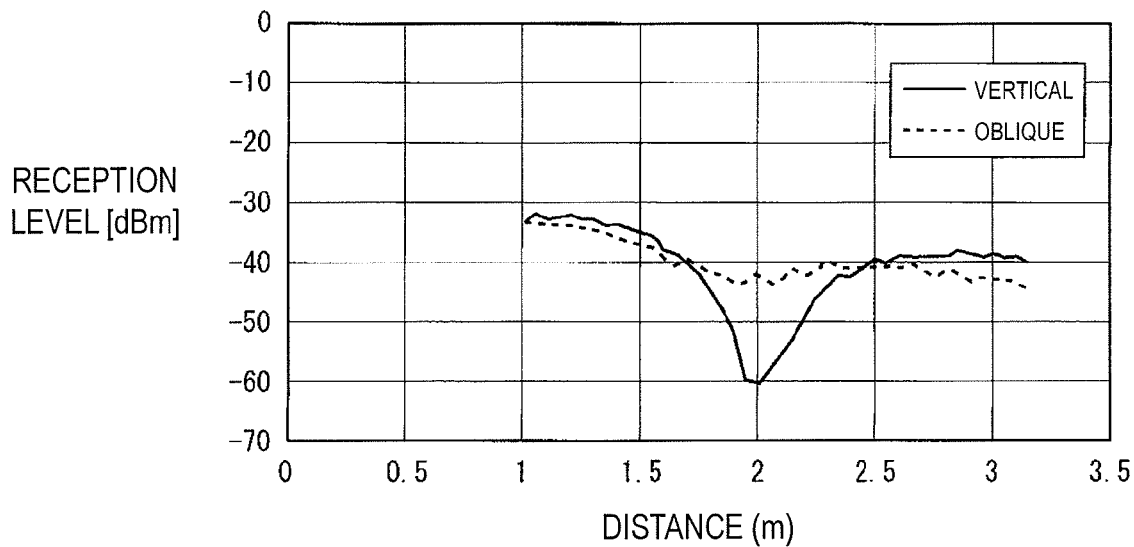
FIG. 4 is a graph illustrating a difference of an effect between the conventional case and the case of the first embodiment.

The effect of this case will be described below. FIGS. 3A and 3B are views illustrating a device used in an experiment to detect a difference of the effect between the conventional configuration (FIG. 3A) and the configuration of the first embodiment (FIG. 3B). A metallic plate 61 was placed in a lateral (a side surface) direction instead of the ground surface, and a variation in reception level was detected in the case that the antenna 52 of an RFID tag 56 was placed in a) direction parallel to the metallic plate 61 (FIG. 3A) and in the case that the antenna 52 was placed in an oblique 45-degree direction (FIG. 3B). FIG. 4 is a graph illustrating an experimental result. At this point, the antenna (not illustrated) of an RFID reader/writer 62 is oriented toward the same direction as the antenna 52 of the RFID tag 56.

In FIG. 4, a vertical axis indicates a reception level (dB) and a horizontal axis indicates a distance (m) from the RFID reader/writer 62. A solid line indicates received data in the case that the antenna is vertically placed, and a dotted line indicates received data in the case that the antenna is obliquely placed by 45 degrees.

In an experimental environment, the null point is generated at a point of 2 m in the case that the antenna is vertically placed, while the influence can largely be reduced in the case that the antenna is obliquely placed. Accordingly, it is found that a large effect to prevent the falling out of the reading exists in the environment in which the slant polarization is dominantly reflected by the floor.

(2) Second Embodiment

Figure 5A:
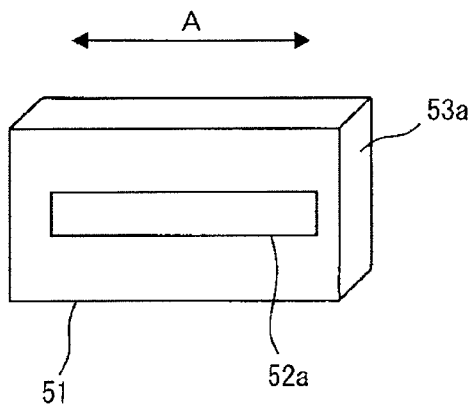
FIGS. 5A and 5B are perspective views illustrating configurations of a conventional RFID tag and an RFID tag according to a second embodiment.

A second embodiment of the present invention will be described below. In a conventional embodiment, as illustrated in FIG. 5A, the RFID tag 51 including a horizontally extending antenna 52a is horizontally provided in a rectangular tag case 53a including a pair of horizontal side facing each other and a pair of vertical sides facing each other (see FIG. 5A).

On the other hand, in the second embodiment, the antenna of the RFID tag 54 is obliquely disposed by around 45 degrees with respect to a reflecting surface (the floor or the wall). Such a structure as the floor and the wall is horizontal or vertical to the ground surface, and the structure is rarely obliquely disposed. That is, usually the reflection point is horizontal or vertical to the ground surface. Because the RFID tag is placed on the pallet, frequently the RFID tag is used in the horizontal or vertical state.

Accordingly, in the case that the antenna of the RFID tag is obliquely placed with respect to the ground surface or the wall, the slant polarization is obtained when viewed from most reflection points.

Figure 5B:
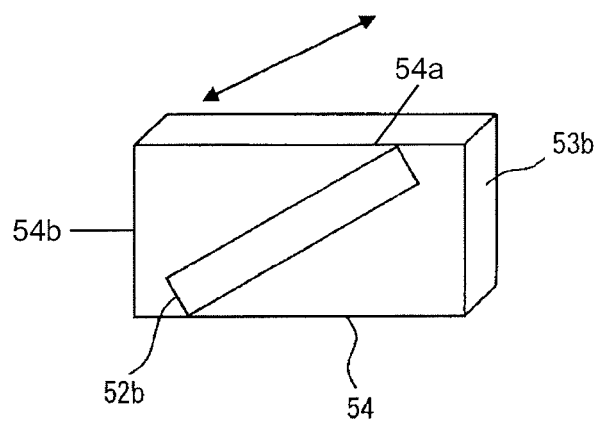

FIG. 5B is a perspective view illustrating the RFID tag of the second embodiment. As illustrated in FIG. 5B, in the second embodiment, the RFID tag 54 includes a long antenna 52b provided in a rectangular surface. The antenna 52b is accommodated in a tag case 53b of the RFID tag 54, and the antenna 52b extends in a direction oblique to sides 54a and 54b constituting the rectangular surface of the tag case 53b. The tag case 53b may be a molding body including the antenna 52b.

Usually, the RFID tag is attached to a tag attachment part provided in the article, and the tag attachment part is provided parallel or vertical to the side of the rectangular surface constituting the article. Accordingly, the polarization plane can be slanted only by attaching the RFID tag to the rectangular tag attachment part.

In the second embodiment, because the antenna 52b itself of the RFID tag 54 is obliquely provided, the antenna 52b is automatically obliquely placed when a user attaches the RFID tag 54 to the predetermined tag attachment part as usual. Therefore, the user can unintentionally use the slant polarization.

In the second embodiment, the tag case is formed into the rectangular shape by way of example. Alternatively, the tag case may have a polygonal shape including a side that becomes a base when the RFID tag is attached to the article, or an arc shape except the side that becomes the base.

In this case, the same effect as the second embodiment is also obtained.

(3) Third Embodiment

A third embodiment of the present invention will be described below. In the case that the pallet is used while the RFID tag is attached to the pallet, the pallet is placed in not only the horizontal direction but also the vertical direction. When the RFID tag is obliquely attached to the pallet by correct 45 degrees, the RFID tag can deal with both the horizontally-placed pallet and the vertically-placed pallet. However, actually the RFID tag is not always obliquely attached to the pallet by correct 45 degrees. In this case, in the first and second embodiments, a communication failure is generated, and the RFID tag cannot deal with both the horizontally-placed pallet and the vertically-placed pallet only when the slant polarization is used. For example, in the case that the RFID tag is placed at obliquely right 45 degrees while the pallet is horizontally placed, the RFID tag becomes obliquely left 45 degrees when the pallet is placed upright. In the case that the polarization plane of the RFID reader/writer is set to obliquely right 45 degrees according to the horizontally-placed pallet, the RFID reader/writer cannot read the RFID tag because the polarization plane of the RFID reader/writer is not matched with the polarization plane of the RFID tag.

The system of the third embodiment can deal with such a case.

In the communication field, sometimes transmitting and receiving antennas facing each other are operated in the circular polarization in order to reduce an influence of ground surface reflection. However, usually the antenna of the RFID tag is formed into a dipole shape, and operated as the linear polarization antenna. Accordingly, when attention is focused on the communication between the RFID reader/writer and the RFID tag, an effect of polarization diversity is small, and the maximum polarization plane is determined by the orientation of the RFID tag irrespective of the existence or non-existence of the reflection from the floor. For this reason, the RFID reader/writer transmits and receives the fixed polarization.

In the configuration of the RFID tag system of the third embodiment, the RFID tag conducts communication with the RFID reader/writer while the antenna of the RFID tag is obliquely placed, and the RFID reader/writer combines a maximum ratio using the polarization diversity while separating the vertical polarization and the horizontal polarization.

The patch antenna can be applied to the antenna of the RFID tag in order to transmit the circularly-polarized radio wave.

Figure 6:
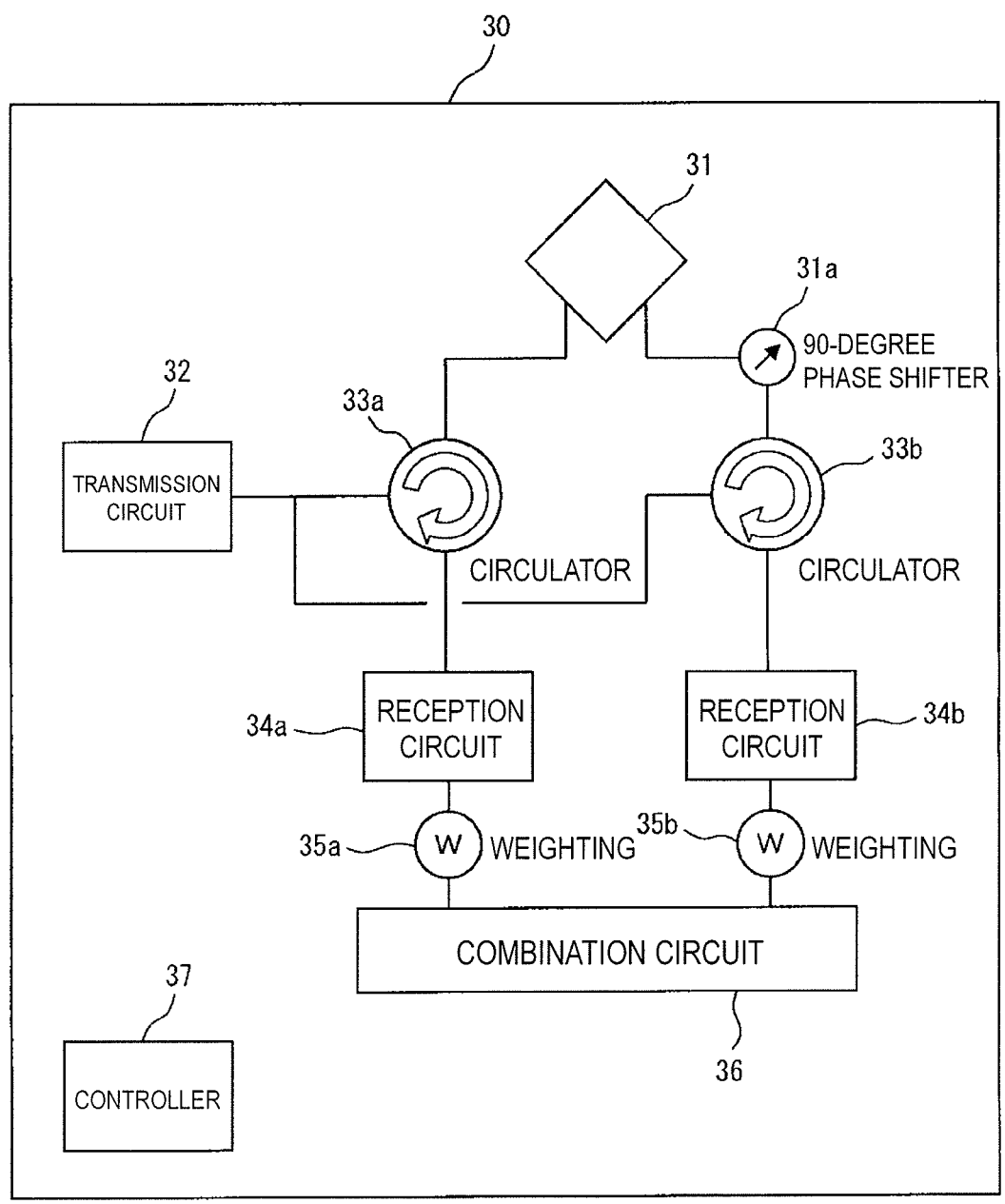
FIG. 6 is a view illustrating a configuration of an RFID reader/writer according to a third embodiment.

FIG. 6 is a block diagram illustrating a circuit configuration of the whole RFID reader/writer in the RFID tag system of the third embodiment. An RFID reader/writer 30 of the third embodiment includes an antenna 31, a transmission circuit 32 that transmits desired data through the antenna 31, a reception circuit 34a that receives the horizontal polarization component, a reception circuit 34b that receives the vertical polarization component, in which the phase of the received signal is changed by 90 degrees, using a 90-degree phase shifter 31a, a combination circuit 36 that is connected to the reception circuits 34a and 34b to combine signals of the reception circuits 34a and 34b, circulators 33a and 33b that switch between the reception circuits 34a and 34b and the transmission circuit 32, and a controller 37 that controls all the circuits.

The reception circuits 34a and 34b receive the horizontal and vertical polarization components, respectively, and the combination circuit 36 logically combines the horizontal and vertical polarization components. The controller 37 reconfigures the data using the combination circuit 36 such that the data always becomes maximum S/N (i.e., a signal-to-noise ratio).

Figure 7:
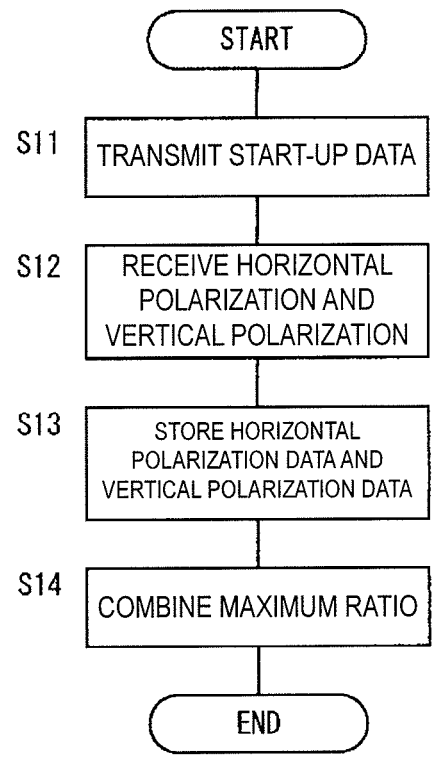
FIG. 7 is a flowchart illustrating an operation of a controller of the RFID reader/writer of the third embodiment.

FIG. 7 is a flowchart illustrating the operation of a controller 37 of the RFID reader/writer 30 of the third embodiment. The transmission circuit 32 transmits start-up data through the antenna 31 in order to start up the RFID tag (not illustrated) (S11). The antenna 31 receives the signal from the RFID tag. At this point, the reception circuit 34a receives the horizontal polarization component and the reception circuit 34b receives the vertical polarization component (S12). The controller 37 separately stores the received data in a memory (not illustrated) (S13). The combination circuit 36 combines the maximum ratio based on the stored data (S14). Specifically, the combination circuit 36 combines the horizontal polarization component and the vertical polarization component such that an S/N ratio of the received signal is enhanced compared with the case that the horizontal polarization component and the vertical polarization component are separately received. Accordingly, the combination circuit acts as the combination part and the optimum combination part. The optimum combination part may be configured to select the received signal having the higher S/N ratio in the received signals of the horizontal polarization component and vertical polarization component. The horizontal polarization and the vertical polarization are described in the third embodiment. Alternatively, the same effect is obtained even if the obliquely-right-45-degree polarization component and the obliquely-left-45-degree polarization component are received.

A verification of the effect of the third embodiment will be described below. In order to verify the effect of the third embodiment, the horizontal and vertical antennas are manually switched instead of the circuit in FIG. 6 to check a difference of the null point.

Figure 8:
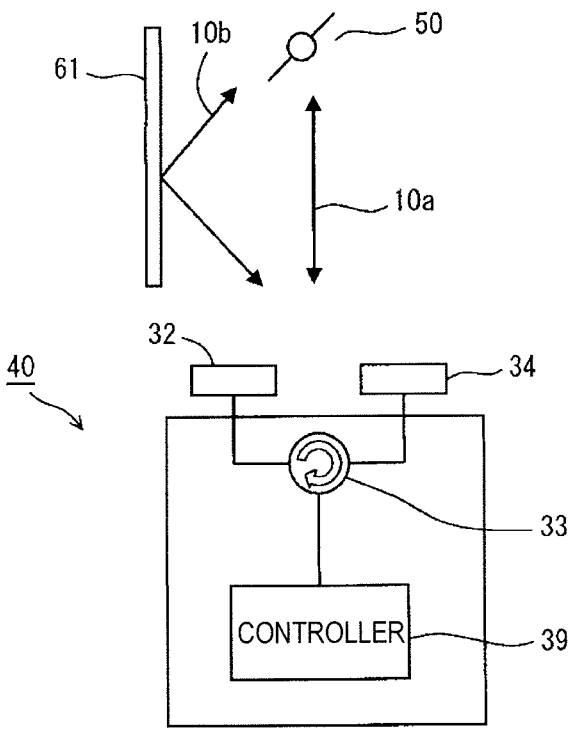
FIG. 8 is a block diagram illustrating a device that verifies an effect of the third embodiment.

FIG. 8 is a block diagram illustrating an entire configuration used in the verification. In the verification, the RFID tag 50 and the RFID reader/writer 40 are disposed while facing each other, and the metallic wall surface 61 is provided as the reflecting surface in the side surfaces of the RFID tag 50 and RFID reader/writer 40 as illustrated in FIG. 3. In FIG. 8, the numeral 10a designates the direct wave and the numeral 10b designates the reflected wave. The RFID reader/writer 40 includes a transmission antenna 32, a reception antenna 34, a circulator 33 that switches between the transmission antenna 32 and the reception antenna 34, and a controller 39 that is connected to the circulator 33.

Figure 9:
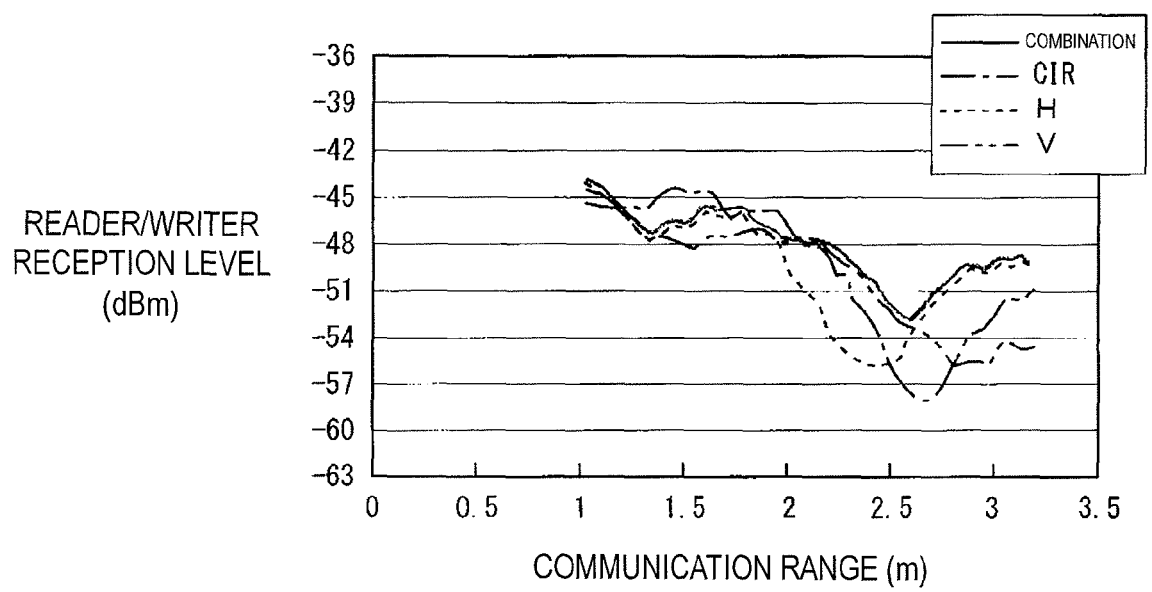
FIG. 9 is a graph illustrating the effect of the third embodiment.

FIG. 9 is a graph illustrating a relationship between a communication range (a horizontal axis) and a reception level (dB) of the RFID reader/writer 40 in each of horizontal polarization H (a dotted line), vertical polarization V (an alternate long and two short dashes line), and the state in which the horizontal polarization H and the vertical polarization V are combined to increase the reception level to the maximum, when the reception antenna 34 is manually switched in the configuration in FIG. 8. FIG. 9 also illustrates circular polarization CIR (an alternate long and short dash line) just for reference.

In each of the horizontal polarization H and the vertical polarization V, the reception level varies significantly according to the communication range. However, when the horizontal polarization H and the vertical polarization V are combined to connect the pieces of data having the highest reception levels (a solid line), the high reception level is obtained irrespective of the communication range. That is, it is checked that the null point can be reduced when the maximum ratio is combined with the combination circuit. In this case, the reception level higher than that of the circular polarization CIR for reference is obtained.

In the third embodiment, from the viewpoint of a placement area, the one antenna is used as the transmission and reception antennas. Alternatively, the transmission and reception antennas may be separated.

In the third embodiment, the two reception circuits are provided as illustrated in FIG. 6. Alternatively, the one reception circuit is provided, a switching circuit is provided to process the horizontal polarization and the vertical polarization in a time-sharing manner, and the maximum ratio may be calculated based on two-time communication result.

The method for processing the horizontal polarization and the vertical polarization in the time-sharing manner is well known as an adaptic array antenna control method by, for example, Japanese Patent No. 4581534. Therefore, the specific description is omitted.

The embodiments of the present invention are described above with reference to the drawings. However, the present invention is not limited to the above embodiments. Various modification and changes can be made without departing from the identical or equivalent scope of the present invention with respect to the illustrated embodiments.

The null point is not generated in the RFID tag of the present invention, so that the RFID tag can advantageously be used.

What is claimed is:

1. An RFID system, comprising:
   an RFID tag having an antenna,
   an RFID reader/writer, the RFID tag and the RFID reader/writer conducting communication with each other, and
   a horizontal surface and/or a vertical surface of an environment of the RFID tag and the RFID reader/writer, wherein the horizontal surface and/or the vertical surface is a reflecting surface,
   wherein the RFID reader/writer includes an antenna that transmits and receives a linearly-polarized radio wave having a polarization plane slanted at a predetermined angle with respect to the reflecting surface, wherein the radio wave emitted from the antenna of the RFID reader/writer is incident on the reflecting surface and changes the polarization direction such that a direct radio wave and a reflected wave exist as cross-polarized components at a position of the RFID tag,
   the antenna of the RFID tag is disposed so as to have the polarization plane identical to the polarization plane of the direct radio wave,
   the antenna of the RFID tag receives and responds to the direct radio wave emitted from the antenna of the RFID reader/writer, and
   both the antenna of the RFID reader/writer and the antenna of the RFID tag are slanted in the same direction.

2. The RFID system according to claim 1, wherein
   the RFID tag comprises a case or a molding body, in which at least an IC and an antenna are accommodated, wherein the case or the molding body is formed into a plate shape having a predetermined side, and
   the antenna of the RFID tag is slanted at a predetermined angle with respect to the predetermined side.

3. The RFID system according to claim 2, wherein the predetermined angle of the antenna of the RFID tag is matched with the predetermined angle of the slanted polarization plane of the polarized radio wave transmitted by the RFID reader/writer, when the RFID tag is disposed while the predetermined side is used as a base.

4. The RFID system according to claim 2, wherein the case or the molding body has a polygonal shape including a rectangle.

5. The RFID system according to claim 2, wherein the antenna of the RFID tag is one of a patch antenna and a dipole antenna.

6. The RFID system according to claim 3, wherein the case or the molding body has a polygonal shape including a rectangle.

7. The RFID system according to claim 3, wherein the antenna of the RFID tag is one of a patch antenna and a dipole antenna.

8. The RFID system according to claim 4, wherein the antenna of the RFID tag is one of a patch antenna and a dipole antenna.

9. A method for conducting a communication between an RFID tag and an RFID reader/writer, the method comprising:
   transmitting, by the RFID reader/writer, a linearly-polarized radio wave having a polarization plane slanted at a predetermined angle with respect to a reflecting surface that is a horizontal surface and/or a vertical surface of an environment of the RFID tag and the RFID reader/writer, wherein the radio wave emitted from the antenna of the RFID reader/writer is incident on the reflecting surface and changes the polarization direction such that a direct radio wave and a reflected wave exist as cross-polarized components at a position of the RFID tag,
   receiving, by an antenna of the RFID tag, the antenna being disposed so as to have the polarization plane identical to the polarization plane of the direct radio wave, the direct radio wave emitted from the antenna of the RFID reader/writer,
   responding, by the antenna of the RFID tag, to the radio wave emitted from the antenna of the RFID reader/writer,
   receiving, by the antenna of the RFID reader/writer, a radio wave from the antenna of the RFID tag, which is incident on the reflecting surface and changes the polarization direction such that a direct radio wave and a reflected wave exist as cross-polarized components at a position of the RFID reader/writer, and
   slanting both the antenna of the RFID reader/writer and the antenna of the RFID tag in the same direction.

* * * * *